United States Patent
Dong

(10) Patent No.: US 7,302,395 B2
(45) Date of Patent: Nov. 27, 2007

(54) SPEECH NOTIFICATION

(75) Inventor: Zhu Dong, Vaerloese (DK)

(73) Assignee: Nokia Corporation, Espoo (FI)

( * ) Notice: Subject to any disclaimer, the term of this patent is extended or adjusted under 35 U.S.C. 154(b) by 881 days.

(21) Appl. No.: 10/658,567

(22) Filed: Sep. 9, 2003

(65) Prior Publication Data

US 2005/0055648 A1    Mar. 10, 2005

(51) Int. Cl.
*G10L 21/00*    (2006.01)
*G06F 9/46*     (2006.01)
*G06F 15/16*    (2006.01)

(52) U.S. Cl. .................. 704/275; 704/270.1; 704/260; 704/258; 705/8; 709/207; 707/10; 707/3; 707/104.1

(58) Field of Classification Search ........ 704/270–275, 704/270.1, 235, 260, 258; 705/8, 9, 1; 709/207; 707/10, 3, 104.1
See application file for complete search history.

(56) References Cited

U.S. PATENT DOCUMENTS

| | | | | |
|---|---|---|---|---|
| 5,416,473 A | * | 5/1995 | Dulaney et al. | 340/7.3 |
| 5,664,063 A | * | 9/1997 | Johnson et al. | 358/1.1 |
| 6,072,859 A | | 6/2000 | Kong | 379/88.16 |
| 6,748,361 B1 | * | 6/2004 | Comerford et al. | 704/275 |
| 6,895,084 B1 | * | 5/2005 | Saylor et al. | 379/88.22 |
| 7,024,363 B1 | * | 4/2006 | Comerford et al. | 704/270 |
| 7,127,400 B2 | * | 10/2006 | Koch | 704/270.1 |

* cited by examiner

*Primary Examiner*—Vijay Chawan
(74) *Attorney, Agent, or Firm*—Perman & Green, LLP

(57) ABSTRACT

A notification device comprises control software including a calendar-type application, which is capable of managing notification messages and where the messages are associated with at least an item of notification content and a time of notification. The method comprises the steps of: deciding to notify a user, based at least in part on a comparison between said time of notification and current time, obtaining an audio signal based on the item of notification content, and outputting the audio signal through a speaker of the portable communication device with the resulting effect of notifying the user.

10 Claims, 2 Drawing Sheets

SPEECH NOTIFICATION

FIELD OF THE INVENTION

The present invention relates to a method and an arrangement for notifying a user of an event. In particular, the invention relates to a method and an arrangement related to a communication device having a calendar-type software application.

BACKGROUND

Calendar-type software applications in computers and other communication devices are becoming more and more versatile and provide a wide variety of complex operational features. Operations that are available in such applications range from basic functions such as creating a reminder for an appointment or a meeting, editing information regarding the appointment etc., to more complex functions such as inviting a plurality of persons to a meeting at a specified time and place, enabling for invitees to respond to an invitation etc.

One particular feature of such calendar-type applications, which in fact is vital for justifying the application's existence, is that of notification. Calendar events, such as meetings and reminders regarding any other activity to perform, must be notified to the user of the calendar application. Generally, such notification is performed by way of presenting to the user a textual or graphic message on a display or by way of an alarm signal output through a speaker. For example, notifications can be more or less complex, ranging from simple pop-up windows on the display screen of the user device and an associated sound signal output through a speaker of the device, to more complex notifications involving automatic sending of E-mail messages to groups of persons, interactive dialogs with users where the user may postpone or re-direct the notification etc.

Nevertheless, a drawback of such type of notifications is that, although they may be very apparent to the user in audiovisual terms, they require at least some action by the user to acquire the content of the notification. For example, the user has to bring the device into view and look at the display in order to acquire graphical and textual information that is presented.

U.S. Pat. No. 6,072,859 discloses an apparatus and method of generating a voice message of a caller's number during an incoming call to a telephone device. Although the disclosure in U.S. Pat. No. 6,072,859 provides an audible voice message of the telephone number of a caller making an incoming call, instead of a simple ringing tone, it relates basically to an improved telephone.

SUMMARY OF THE INVENTION

The object of the invention is hence to overcome disadvantages related to solutions according to prior art by improving the manner in which users are notified when using a portable communication device having a calendar-type software application.

The object is achieved by way of a method and an arrangement according to the appended claims.

According to a first aspect of the invention, a method of user notification in a portable communication device is provided. The device comprises control software including a calendar-type application, which is capable of managing notification messages and where the messages are associated with at least an item of notification content and a time of notification. The method comprises the steps of: deciding to notify a user, based at least in part on a comparison between said time of notification and current time, obtaining an audio signal based on the item of notification content, and outputting the audio signal through a speaker of the portable communication device.

An advantage of the invention is that it facilitates for the user in that the user does not have to take any action in order to acquire information regarding the notification.

In a preferred embodiment, the notification content comprises text, which may be used to obtain a synthesized speech signal, which in turn is converted to an audio signal suitable for output to a user. This has an advantage in that it increases the convenience for the user when managing notifications.

In another embodiment, the notification content comprises a sound signal such as a voice message, which has been recorded by the user, e.g., when creating an event with an associated notification in the calendar-type application.

PREFERRED EMBODIMENTS

A communication device having a calendar-type application that is capable of speech notification will now be described with reference to the appended drawings. It should be noted, however, that no detailed description will be made of the calendar-type application as such. It is assumed that the skilled person will realize how to implement the functionality of the present invention as, for example, a separate notification application having one type of communication interface with the calendar-type application, or as a function within a calendar-type application having another type of communication interface with the application.

It is also to be noted that no detailed description will be made of any specific user communication interface, as it would depend on the specific type of calendar-type application with which the inventive notification function interacts, as the skilled person will understand.

The present invention is intended for use in a relatively compact, portable communication device such as a personal digital assistant (PDA) and particularly in a communication terminal in the form of, e.g., a cellular telephone.

Computer program code, which implements a method according to the invention, with or without program code of other functions of the calendar-type application, may reside in fixed or removable memory of a device according to the invention. Any type of conventional removable memory is possible, such as a semi-permanent storage chip such as a flash memory card or "memory stick" etc. The program code of the invention may also be considered as a form of transmitted signal, such as a stream of data communicated via the Internet or any other type of communication network, including cellular radio communication networks of any kind, such as GSM/GPRS, UMTS, CDMA 2000 etc.

Figure 1:
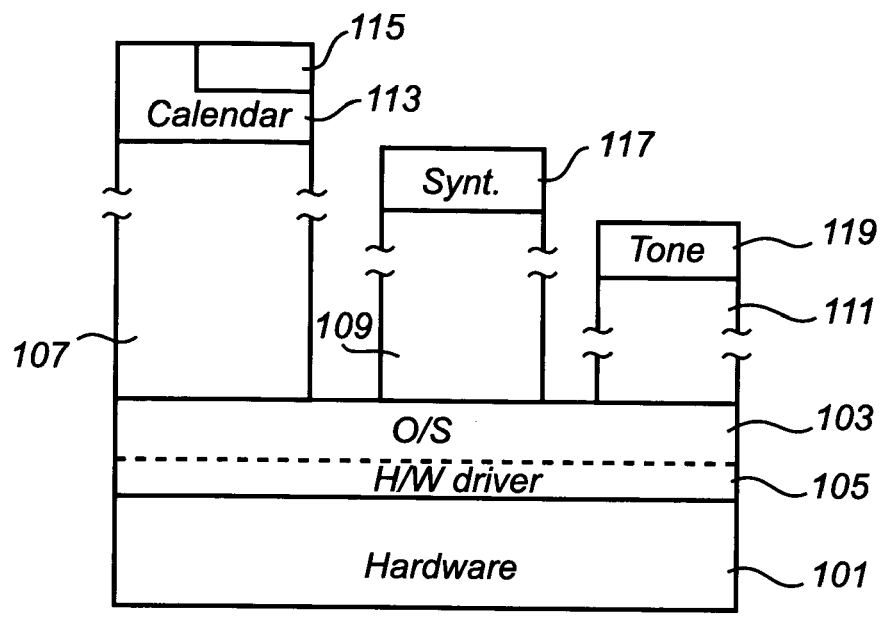
FIG. 1 shows schematically a view of software and hardware components comprised in an arrangement according to the present invention.

Turning now to FIG. 1, we see a view schematically depicting blocks of software and hardware components comprised in an arrangement according to the present invention. As will be discussed further below, the hardware components include a processor, memory and input/output hardware and is in FIG. 1 indicated by one single hardware block 101.

Located "on top" of the hardware block 101 is the software. An operating system 103 having specific functionality in the form of hardware drivers or controllers 105 to communicate with, and control, the hardware 101. As the skilled person realizes, the operating system is resides generally in a more or less protected part of the memory of the device. To exemplify, the operating system 103 may be one specifically adapted for use in PDA's or mobile communication terminals such as Symbian.

On top of the operating system 103 are three protocol stacks indicated, a first stack 107 at the top of which is a calendar-type application 113 comprising a speech notification module 115, a second stack 109 on top of which is a speech synthesis software module 117 and a third protocol stack 111 on top of which is a tone converter module 119. As the skilled person will understand, the protocol stacks may also be one single stack and the modules 113, 117 and 119 communicating directly within that single stack.

As will be described in some more detail below in connection with FIG. 3, the software components 103, 105, 113, 115, 117, 119 communicate with each other through the protocol stacks 107, 109 and 111. The calendar application 113 creates notes or messages intended for a user, where the notes comprise notification text and time of notification. The speech synthesis software module 117 generates the proper signal based on the notification text. The tone converter module 119 converts the signal from a speech synthesis format to an alarm tone format, which in turn is recognized by the hardware control software 105.

Figure 2:
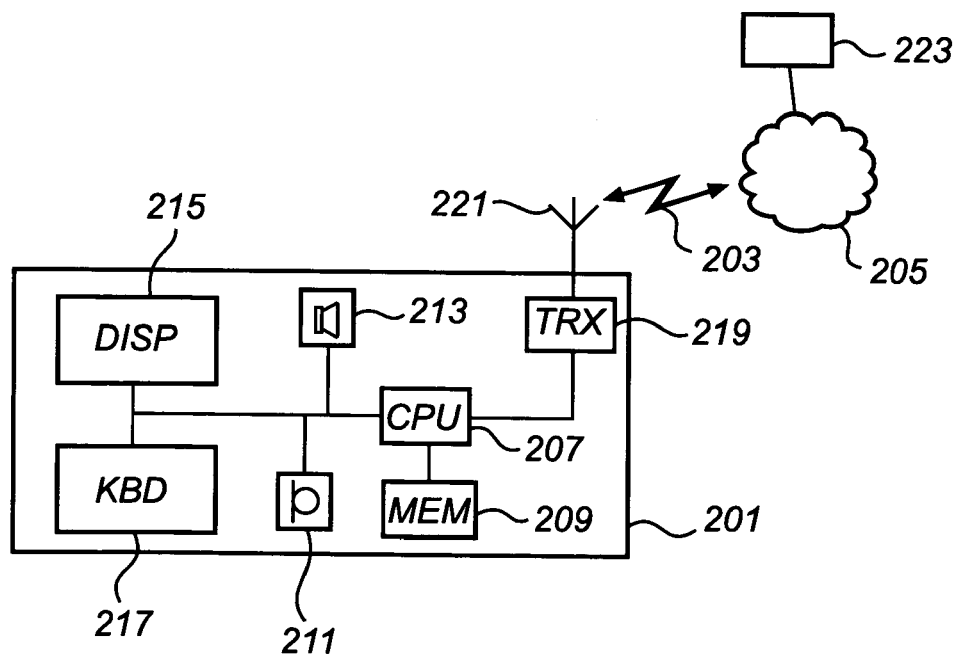
FIG. 2 shows schematically a block diagram of a portable communication terminal according to the present invention.

FIG. 2 illustrates schematically a communication terminal 201 in which the present invention is implemented. The terminal 201 is capable of communication via an air interface 203 with a radio communication system 205 such as the well known systems GSM/GPRS, UMTS, CDMA 2000 etc. The terminal comprises a processor 207, memory 209 as well as input/output units in the form of a microphone 211, a speaker 213, a display 215 and a keyboard 217. Radio communication is realized by radio circuitry 219 and an antenna 221. The details regarding how these units communicate are known to the skilled person and is therefore not discussed further.

The communication terminal 201 may for example be a mobile telephone terminal or a PDA equipped with radio communication means. The method according to the present invention will in general reside in the form of software instructions, together with other software components as described in connection with FIG. 1, in the memory 209 of the terminal. The software instructions of the inventive notification function may be provided into the memory 209 in a number of ways, including distribution via the network 205 from a software supplier 223.

Figure 3:
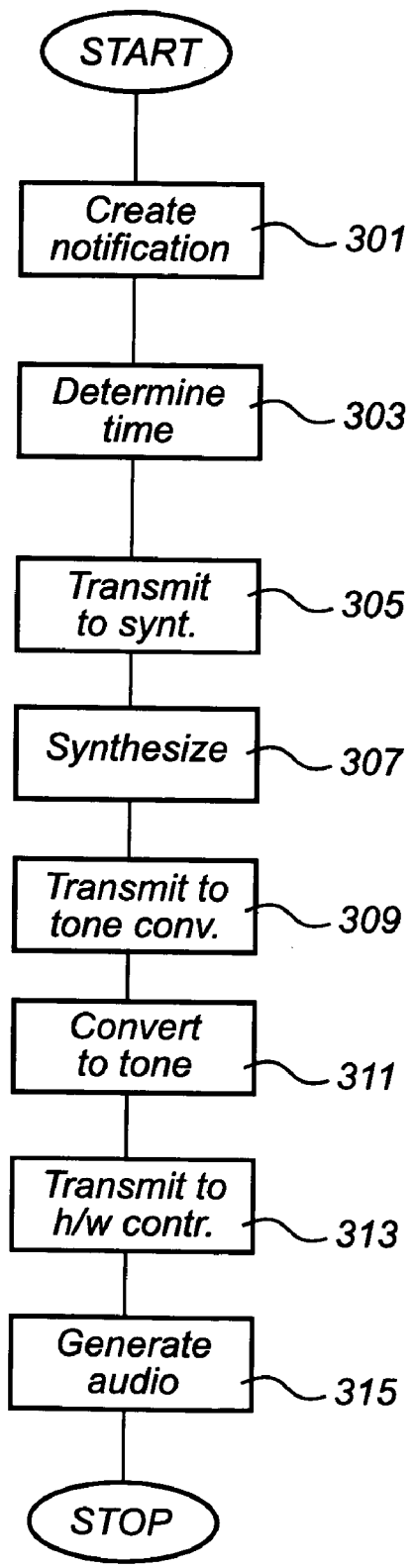
FIG. 3 is a flow chart illustrating a number of steps of a method according to the present invention.

Turning now to FIG. 3, a method according to the invention will now be described in terms of a number of steps to be taken by the speech notification software module (115 in FIG. 1) when running in conjunction with a calendar-type application in, e.g., a communication terminal such as the one schematically illustrated in FIG. 2.

In a creation step 301, a notification message is created. The notification message includes, i.e. having associated with it, at least a string of notification text and a time of notification.

In a detection step 303, a comparison is made between current time and the time of notification associated with the notification message. That is, this step determines whether or not a notification messages is ready to be provided to a user. It should be noted that this step may, in fact, be implemented as a loop during which a comparison is made between current time and time of notification associated with a plurality of notification messages, or using an event scheme familiar to the person skilled in the art.

In a transmission step 305, a notification message, or at least the notification text of a notification message, which in the detection step 303 has been determined to be ready to be provided to a user, is passed on to the speech synthesis module (117 in FIG. 1).

In a synthesizing step 307, the speech synthesis module (117 in FIG. 1) receives the notification text and performs a synthesis procedure, resulting in a speech signal having an appropriate data format for the tone converter module (119 in FIG. 1).

In a transmission step 309, the speech signal is transmitted to the tone converter module (119 in FIG. 1).

In a conversion step 311, the speech signal i.e. the synthesized notification text is converted into a signal having a tone format, having an appropriate data format for the hardware controller software (105 in FIG. 1) that is responsible for outputting sound via the speaker (213 in FIG. 2).

In a transmission step 313, the tone format signal is transmitted to the hardware controller software (105 in FIG. 1).

In an audio generation step 315, the hardware controller software 105 outputs the tone format signal through the speaker (213 in FIG. 2). The resulting sound emanating from the speaker is hence a synthesized voice, speaking the text contained in the notification message.

A variation of the embodiment presented above is one where a user records an audio signal by simply speaking into the microphone (211 in FIG. 2) and associating the recorded audio signal with a notification message. At the time of notification, i.e. following the detection step 303 as discussed above, the recorded audio signal is automatically output through the speaker (213 in FIG. 2).

Even though the present invention has been described by way of preferred embodiments it is to be noted that other variations and combinations of features are possible within the scope of the inventive concept, as the person skilled in the art will recognize, and hence the invention is limited only by the appended claims.

The invention claimed is:

1. A method of user notification in a device, said device comprising control software including a calendar-type application, said calendar-type application being capable of managing notification messages, said messages having associated with them at least an item of notification content and a time of notification, said method comprising the steps of:
   comparing said time of notification and current time,
   deciding to notify a user, based at least in part on said comparison between said time of notification and current time,
   subsequently to said comparison of time, obtaining an audio signal based on said item of notification content, and
   outputting said audio signal through a speaker of said portable communication device.

2. The method according to claim 1, wherein said notification content comprises text.

3. The method according to claim 2, wherein the step of obtaining an audio signal entails obtaining a synthesized speech signal, said speech signal being based at least in part on a speech-synthesized version of said notification text, and further comprising the step of:

converting said synthesized speech signal into said audio signal.

4. The method according to claim 1, wherein said device is a portable communication device, and said notification content comprises a recorded sound signal.

5. Computer readable medium on which is stored computer readable software instructions capable of performing a method according to claim 1.

6. Signal source comprising computer readable software instructions capable of performing a method according to claim 1.

7. A device comprising control software including a calendar-type application, said calendar-type application being capable of managing notification messages, said messages having associated with them at least an item of notification content and a time of notification, said device further comprising:

means for comparing said time of notification and current time, means for deciding to notify a user, based at least in part on said comparison between said time of notification and current time, means for obtaining an audio signal based on said item of notification content subsequently to said comparison of time, and means for outputting said audio signal through a speaker of said portable communication device.

8. The device according to claim 7, wherein said notification content comprises text.

9. The device according to claim 8, wherein the means for obtaining an audio signal comprises means for obtaining a synthesized speech signal, said speech signal being based at least in part on a speech synthesized version of said notification text, and further comprising:

means for converting said synthesized speech signal into said audio signal.

10. The device according to claim 7, wherein said device is a portable communication device, and said notification content comprises a recorded sound signal.

* * * * *